United States Patent
Laisement et al.

(10) Patent No.: US 7,727,074 B2
(45) Date of Patent: Jun. 1, 2010

(54) STAMPED CARDAN JOINT YOKE MEMBER FOR AN AUTOMOTIVE VEHICLE STEERING COLUMN

(75) Inventors: Andre Laisement, La Chapelle Encherie (FR); Jacques Loyau, Saint Amand Longpre (FR); Pascal Millet, Vendome (FR)

(73) Assignee: ZF Systems de Direction Nacam, S.A.S., Vendome (FR)

( * ) Notice: Subject to any disclaimer, the term of this patent is extended or adjusted under 35 U.S.C. 154(b) by 0 days.

(21) Appl. No.: 12/287,527

(22) Filed: Oct. 11, 2008

(65) Prior Publication Data

US 2009/0111590 A1 Apr. 30, 2009

Related U.S. Application Data

(63) Continuation of application No. PCT/FR2007/051126, filed on Apr. 18, 2007.

(30) Foreign Application Priority Data

Apr. 19, 2006 (FR) .................................. 06 03688

(51) Int. Cl.
*F16D 3/40* (2006.01)
(52) U.S. Cl. ..................................................... 464/134
(58) Field of Classification Search ................. 464/134, 464/135; 403/157; 72/379.2; 29/DIG. 37
See application file for complete search history.

(56) References Cited

U.S. PATENT DOCUMENTS

| 4,361,024 A | * | 11/1982 | Haldric | ................. 72/379.2 X |
| 4,365,909 A | * | 12/1982 | Stephan | ...................... 403/157 |
| 5,188,474 A | * | 2/1993 | Ohkubo et al. | .......... 464/134 X |
| 5,575,581 A | * | 11/1996 | DeBisschop | ................. 403/157 |
| 5,628,578 A | * | 5/1997 | McClanahan et al. | |
| 5,813,788 A | * | 9/1998 | Yamamoto et al. | ...... 464/134 X |

FOREIGN PATENT DOCUMENTS

| FR | 2 441 759 A1 | 6/1980 | |
| FR | 2 448 068 A1 | * 10/1980 | ................. 464/135 |
| FR | 2 525 130 A1 | 10/1983 | |

* cited by examiner

*Primary Examiner*—Greg Binda
(74) *Attorney, Agent, or Firm*—Lawrence E. Laubscher, Sr.; Lawrence E. Laubscher, Jr.

(57) ABSTRACT

The yoke member of Cardan joint is made in one unitary part of one piece and includes a pivot fork including two pivot arm portions each comprising a crossing hole, the axis of which is the pivot axis of a cross-piece, and a connecting element for the motion transmission shaft and having two tightening portions connected via a junction portion. Each of the two tightening portions comprises a tightening hole. Four reinforcing appendices are arranged on the tightening portions and opposite one another in pairs to form together with the portions a housing for the motion transmission shaft. The yoke member is stamped in order to give it the desired thickness in highly stressed and lowly stressed regions.

13 Claims, 4 Drawing Sheets

Prior Art

STAMPED CARDAN JOINT YOKE MEMBER FOR AN AUTOMOTIVE VEHICLE STEERING COLUMN

REFERENCE TO RELATED APPLICATIONS

The present application is a continuation of the PCT International Application No. PCT/FR2007/051126 filed Apr. 18, 2007, which is based on the French Application No. 0603688 filed Apr. 19, 2006.

BACKGROUND OF THE INVENTION

1. Field of the Invention

The present invention relates to a stamped yoke member of a Cardan joint, being more specifically used in steering columns of automotive vehicles, and more particularly in steering columns provided with an assistance device.

2. Description of the Related Art

The current steering column of an automotive vehicle comprises two portions: a top portion, which is connected to the steering wheel, and a middle portion which is connected to the gearbox that controls a steering rod for the steering wheels. The top portion and the middle portion are connected with each other by a homokinetic joint, called a Cardan joint.

The middle portion is also connected to the pinion of the gearbox through a homokinetic joint or a Cardan joint. Each of the two Cardan joints comprises a cross-piece arranged between two yoke members. As far as the Cardan joint of the top portion is concerned, one of the yoke members is connected to the top portion and the other one is connected to the middle portion.

As far as the Cardan joint of the steering pinion is concerned, one of the yoke members is connected to the middle portion, and the other one is connected to the steering pinion.

When the steering column comprises an assistance device, the latter can consist in an electric system or a hydraulic system.

For both systems, there are two types of assisted steering gear depending on the assistance device arrangement: either the assistance device is arranged on the top portion of the steering column, this is the column assisted steering gear, or the assistance device is arranged directly on the steering rack, this is the pinion assisted steering gear, referring to the steering pinion driving the rack.

In the case of an electric or hydraulic assisted steering gear, a high torque is to be transmitted at the assistance outlet, i.e. at the motion outlet in the top portion of the column.

The high torque is therefore to be transmitted upstream the middle portion of the column, i.e. upstream each of both transmission Cardan joints which are arranged at each end of the column middle portion, on the one hand, on the top portion side of the column and, on the other hand, on the steering pinion side. Since each transmission Cardan joint comprises two yoke members of Cardan joint, there are thus four yoke members of Cardan joint that should be able to transmit a high torque.

In the case of a pinion electric assisted steering gear and in the case of the pinion hydraulic assisted steering gear, the high torque is directly applied on the rack. The torque transmitted by the top portion of the column and by the middle portion of the column is thus relatively low. This is also true for all four yoke members of Cardan joint, which transmit a relatively low torque.

Figure 5:
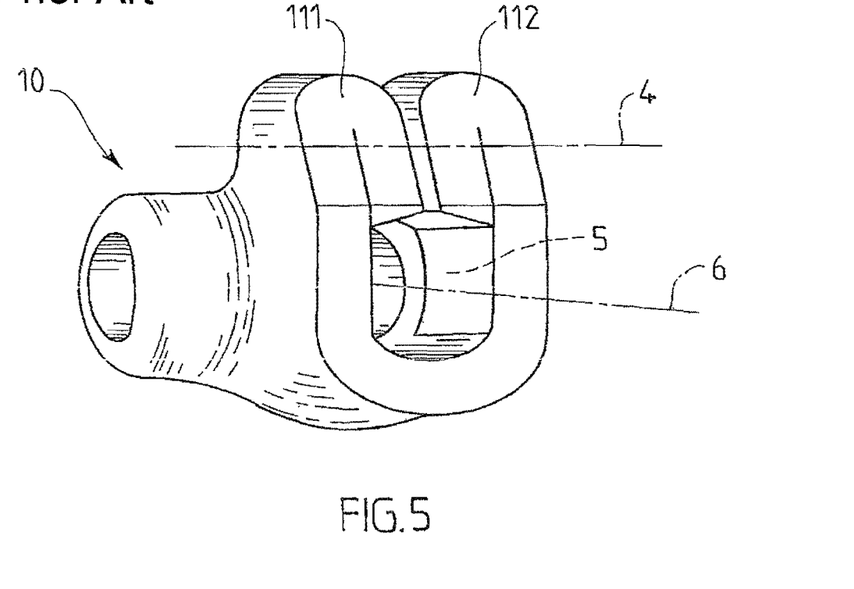
FIG. 5 is a perspective view of a stamped yoke member of Cardan joint according the prior art.

There are stamped yoke members of Cardan joint such as shown and designated by reference numeral 10 on FIG. 5, which is obtained through deforming a thick metal sheet without modifying the thickness. For this purpose, a blank is cut from the metal sheet, the thickness of which depends on its extending abilities so as to give it the final shape through stamping. The yoke member 10 of Cardan joint is mounted and immobilized on a non shown transmission shaft 5, the transmission axis of which is denoted 6. A tightening system is provided by a screw with a tightening axis 4, said tightening screw being mounted on two pliers 111 and 112 in order to bring them nearer one to the other so as to immobilize the yoke member 10 on the transmission shaft 5. In order to provide the pliers 111 and 112, the metal sheet is folded on itself. In the case where there is a high tightening torque and a high rotation torque on the transmission shaft, some sliding occurs between both portions one relative to the other on each of both pliers 111 and 112. Such a sliding results in the loosening of the tightening screw and in some play between the transmission shaft 5 and the yoke member 10. In the case of an excessively strong tightening, there is some contact between the pliers returns, resulting in a lack of tightening on the transmission shaft.

SUMMARY OF THE INVENTION

An object of the present invention is to provide a stamped yoke member of Cardan joint, more particularly for an automotive vehicle steering column provided with an assistance device, overcoming the above described disadvantages, so as to have a yoke member of Cardan joint allowing to pass higher rotation driving and tightening torques on the transmission shaft; whereby the yoke member of Cardan joint has a sufficient screw tapping function for tightening and a sufficient reaction function for holding the transmission shaft, that is for having higher performances in some regions.

Moreover, the stamped yoke member of Cardan joint should have substantially equivalent size and weight or even lower ones.

According to the invention, the yoke member of Cardan joint of a motion transmission shaft includes a yoke member pivot axis and a tightening axis on the transmission shaft.

Said yoke member of Cardan joint is made integrally in one unitary part through stamping and obtained through deforming a metal sheet, the thickness of which is so defined as to meet the holding and strength functions in lowly stressed regions.

Said metal sheet comprises an excess of material in the vicinity of the highly stressed reinforced regions. Deforming said metal sheet occurs without any breaking of the material fibers making up such metal sheet, i.e. without any folding, so that said yoke member be only made up of continuous fibers so as to obtain the desired thickness in the desired sizes, for each of the highly stressed and lowly stressed regions.

The said yoke member includes: a pivot fork including two pivot arm portions each comprising a crossing hole, the axis of which is the pivot axis of the cross-piece, and a connecting element for the motion transmission shaft, said connecting element having two tightening portions connected one to the other via a junction portion, each of the two tightening portions comprising a tightening hole, the axis of which is the tightening axis, the material excess being arranged in the vicinity of a corresponding transversal end face of said connecting element.

According to the invention, said yoke member of Cardan joint includes at least one reinforcing appendix arranged on a tightening portion in the vicinity of the tightening hole.

According to an alternative embodiment, said yoke member of Cardan joint includes two reinforcing appendices, each reinforcing appendix being arranged on the corresponding tightening portion in the vicinity and on the same side of the tightening hole, thereby to be opposite one relative to the other.

According to another alternative embodiment of the invention, said yoke member of Cardan joint includes two reinforcing appendices which are arranged on the same tightening portion in the vicinity and on both sides of the tightening hole.

According to another alternative embodiment, said yoke member of Cardan joint includes two reinforcing appendices, one reinforcing appendix being arranged on one of the tightening portions in the vicinity and on one side of the tightening hole, and the other reinforcing appendix being arranged on the other tightening portion in the vicinity and on the other side of the tightening hole.

According to another alternative embodiment of the invention, said yoke member of Cardan joint includes:
  two reinforcing appendices, each reinforcing appendix being arranged through stamping on the corresponding tightening portion in the vicinity and on the same side of the tightening hole, thereby to be opposite one relative to the other and in the vicinity of the transversal end face,
  two other reinforcing appendices, each reinforcing appendix being arranged through stamping on the corresponding tightening portion in the vicinity and on the same side of the tightening hole, thereby to be opposite one relative to the other and in the vicinity of the transversal end face.

Advantageously, the reinforcing appendix has a tapering section decreasing from the tightening portion on which it is arranged, and it is located in the vicinity or merged with the corresponding transversal end face.

In order to improve the tightening abilities, one of the tightening holes, intended to accommodate a screw tapping, is surrounded with a reinforcing appendix on the external face of the corresponding tightening portion, said reinforcing appendix being obtained through plunging starting from a smaller hole.

According to the invention, the two opposite appendices make up, together with each of the tightening portions and with the junction portion, the housing of the motion transmission shaft.

Preferably, the two opposite appendices and the junction portion have their internal faces which are circular and which are connected by each of the external faces of the tightening portions, so that said internal faces have dimensions and shapes matching the dimensions and the shape of the transmission shaft which comprises two circular portions connected by two lands.

According to a particularly interesting embodiment of the invention, said yoke member includes:
  the pivot fork including the two pivot arm portions arranged on both sides and symmetrically with respect to the transmission axis of the shaft and each comprising the crossing hole, the axis of which is the pivot axis,
  the connecting element including the two tightening portions arranged on both sides and symmetrically with respect to the transmission axis, connected one to each other by the junction portion, and each comprising the tightening hole, the axis of which is the tightening axis,
  each of the two pivot arm portions being offset and connected to the corresponding tightening portion by diverging from the transmission axis,
  the four reinforcing appendices, the two reinforcing appendices being opposite and arranged on the same side and in the vicinity of the tightening hole, the two other reinforcing appendices being opposite one relative to the other and arranged on the other side and in the vicinity of the tightening hole, each of the reinforcing appendices being connected to the corresponding tightening portion, so as to achieve, with the junction portion, two housings with internal shapes conjugated with the shape of the transmission shaft,
  one of the tightening holes, intended to accommodate a screw tapping, is surrounded with a reinforcing appendix on the external face of the corresponding tightening portion.

The embodiment of a yoke member of Cardan joint according to the invention includes the following steps of:
  cutting a thick metal sheet with an excess of material with shapes for all four appendices,
  heat treating depending on the desired strength,
  operating on a transfer press:
  1. offsetting the two pivot arm portions upwards,
  2. punching the hole of each of the two arm portions,
  3. shifting material through stamping to the desired position of all four shapes for the appendices,
  4. punching each of the two tightening holes, one of the two holes having a crossing diameter for accommodating the screw, and the other hole being smaller so as to achieve the reinforcing appendix obtained through plunging before screw tapping,
  5. shifting material through plunging so as to obtain the reinforcing appendix of the tightening hole,
  6. folding downwards so as to bring closer the two tightening portions with their corresponding pivot arm portion at approximately 60° relative to each other,
  7. hitting each of the two tightening portions, so as to obtain the final shape with the two tightening portions and the two pivot arm portions parallel to each other.

According to an application of this invention, the yoke member of Cardan joint is arranged in a steering column on at least one end of the middle portion. In an alternative embodiment of such an application, the steering column is equipped with an electric assistance on the top portion of the column.

The stamped yoke member of Cardan joint according to the invention has thus this advantage to have a structure achieved through deforming a metal sheet, this occurring without breaking the fibers of material making up said metal sheet, so that said yoke member be only made up of continuous fibers, thereby to obtain the desired thickness in the desired sizes for each of the highly stressed and lowly stressed regions. Thus, the yoke member of Cardan joint according to the invention has a screw tapping function for tightening being sufficient, and has a reacting function for holding the transmission shaft being also sufficient.

BRIEF DESCRIPTION OF THE DRAWINGS

Other features and advantages of the present invention will be more apparent when reading the following description of several preferred embodiments of this invention, given as non limitative examples, referring to the corresponding appended drawings, wherein.

DETAILED DESCRIPTION

Figure 1:
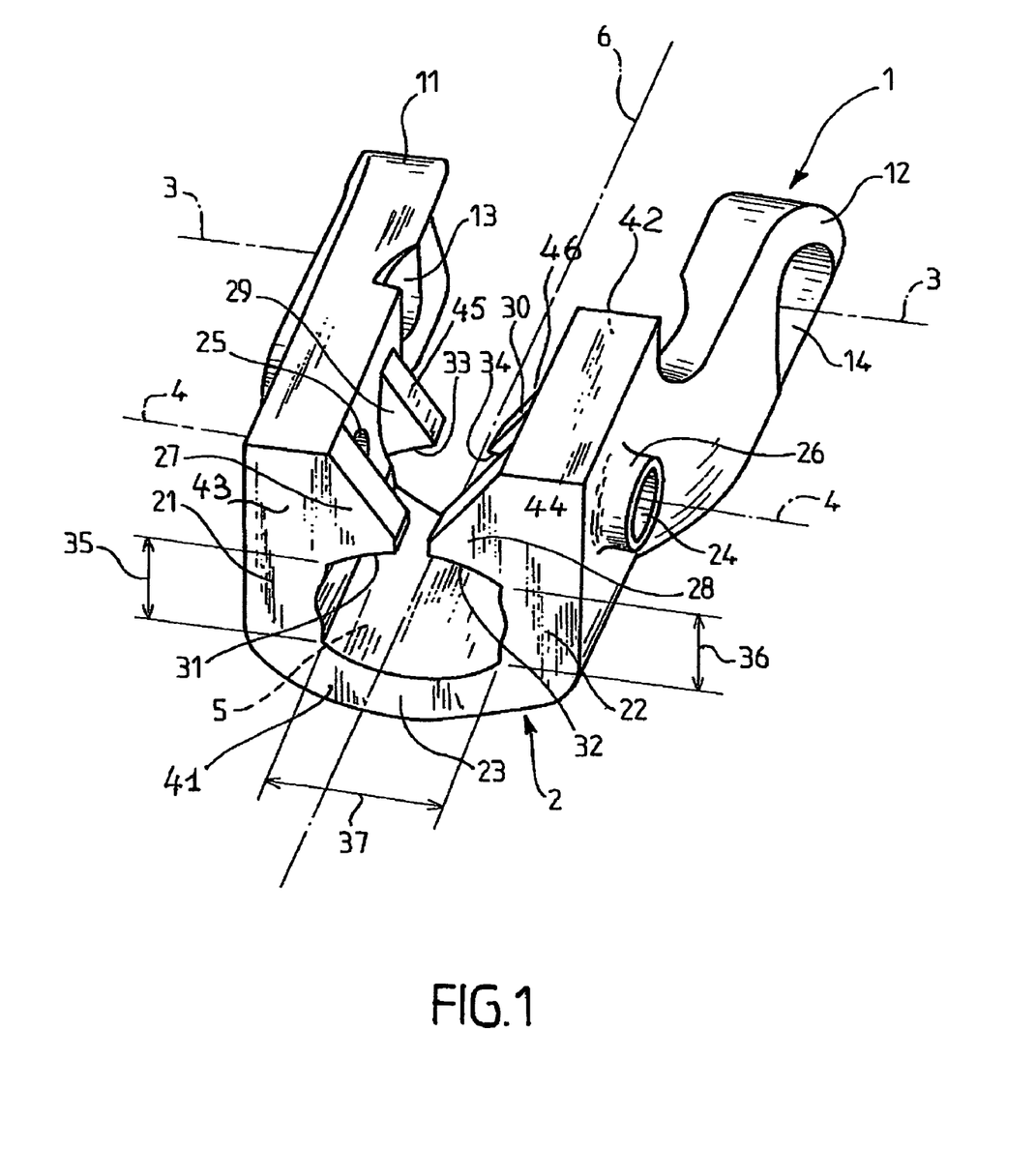
FIG. 1 is a perspective view of the stamped yoke member of Cardan joint according to the invention, seen from the transmission shaft side.
Figure 2:
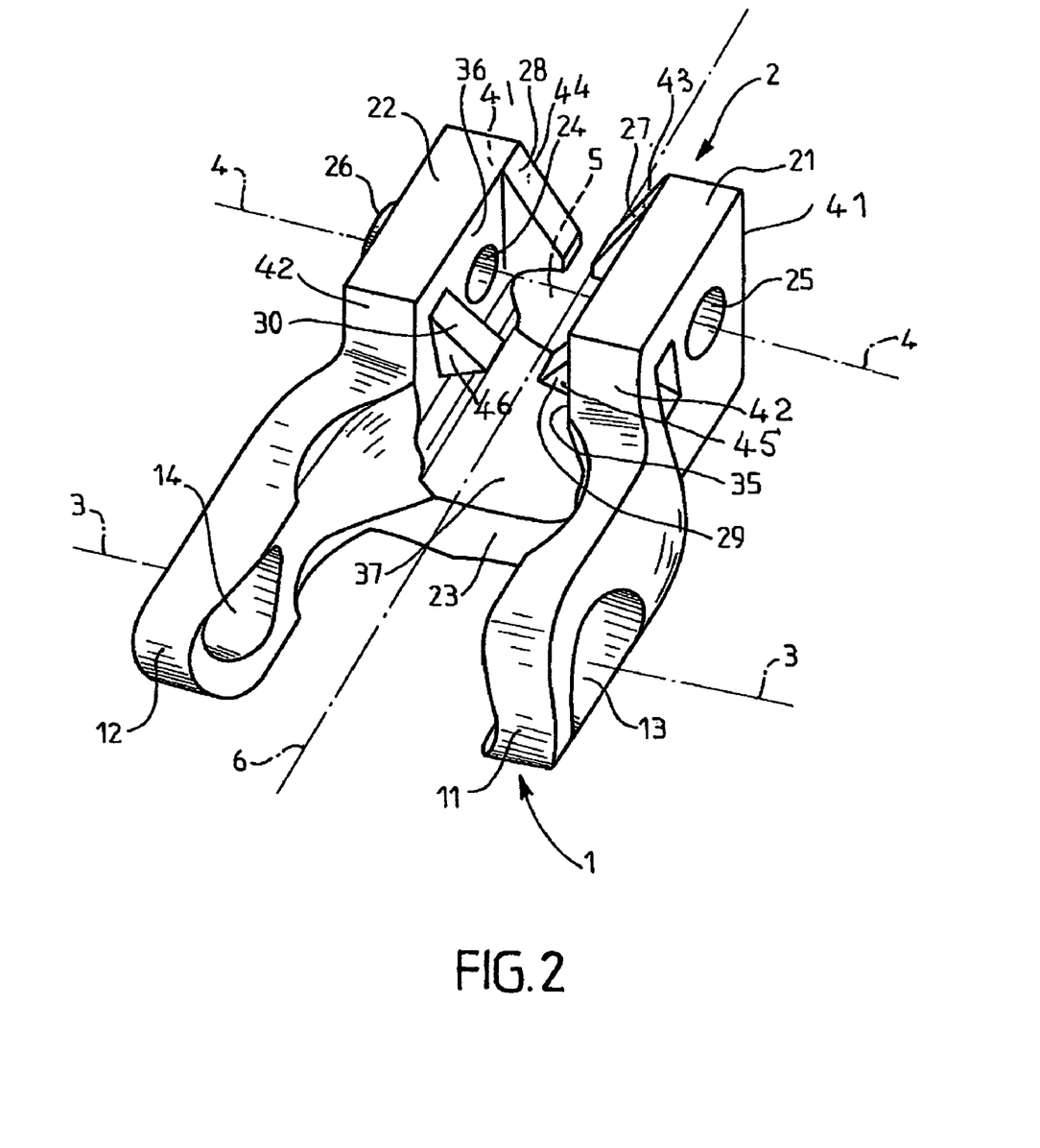
FIG. 2 is a perspective view of the stamped yoke member of Cardan joint shown on FIG. 1, seen from the cross-piece side.

As shown on FIGS. 1 and 2, the yoke member of Cardan joint of a motion transmission shaft 5 according to the invention includes a pivot fork 1 and a connecting element 2 for the motion transmission shaft 5, the axis of which is the motion transmission axis 6.

The pivot fork 1 comprises two pivot arm portions 11 and 12 which are arranged on both sides and symmetrically with respect to a vertical plane crossing the transmission axis 6. The pivot arm portions 11 and 12 respectively comprise crossing holes 13 and 14 which are aligned along the same axis perpendicular to the vertical plane of the axis 6, which is the pivot axis 3 of the cross-piece of the Cardan joint.

The connecting element 2 is made up of two tightening portions 21 and 22 which are arranged on both sides and symmetrically relative to the vertical plane of the axis 6. The tightening portions 21 and 22 are connected with each other via a junction portion 23 and respectively comprise tightening holes 25 and 24 which are aligned along the same axis perpendicular to the vertical plane of the axis 6, which is the tightening axis 4 on the transmission shaft 5. The tightening hole 24 is intended to accommodate a screw tapping and is surrounded with a reinforcing appendix 26 arranged on the external face of the corresponding tightening portion 22.

In the remainder of the description, internal stands for what is the closest to the vertical plane of the axis 6, and external corresponds to what is the most distant. The reinforcing appendix 26 is provided by means of an operation referred to as plunging starting from a smaller hole.

The tightening hole 25 thus allows for a non shown tightening screw to cross, the screw being screwed in the tapped hole 24 and the head of the screw abutting against the external face of the tightening portion 21.

The pivot fork 1 has both its pivot arm portions 11 and 12 which are offset and connected to the corresponding tightening portion 21 and 22 and symmetrically diverge from the vertical plane of the axis 6.

The connecting element comprises four reinforcing appendices 27, 28, 29 and 30. Both reinforcing appendices 27 and 28 are arranged through stamping on the tightening portions 21 and 22 of the same side of the corresponding tightening holes 25 and 24, thereby to be opposite one relative to the other.

The reinforcing appendix 27 is located on the tightening portion 21 in the vicinity of the tightening hole 25, and the reinforcing appendix 28 is located on the tightening portion 22 in the vicinity of the tightening hole 24.

Both reinforcing appendices 29 and 30 are arranged through stamping on the tightening portions 21 and 22 of the same side of the corresponding tightening hole 25 and 24, thereby to be opposite one relative to the other. The reinforcing appendix 29 is located on the tightening portion 21 in the vicinity of the tightening hole 25, and the reinforcing appendix 30 is located on the tightening portion 22 in the vicinity of the tightening hole 24.

Each reinforcing appendix 27, 28, 29 and 30 has a tapering section decreasing from the corresponding tightening portion 21, 22 onto which said reinforcing appendix is arranged.

Both opposite reinforcing appendices 27 and 28 are connected to the corresponding tightening portions 21 and 22, thereby to make up together with the junction portion 23 a housing of the motion transmission shaft 5. Both opposite reinforcing appendices 29 and 30 are connected to the corresponding tightening portions 21 and 22, thereby to make up together with the junction portion 23 a housing of the motion transmission shaft 5. Both housings being made up that way have shapes conjugated with the shape of the transmission shaft 5.

The four reinforcing appendices 27, 28, 29 and 30 have internal faces respectively denoted 31, 32, 33 and 34. Both tightening portions 21, 22 respectively have internal faces 35, 36 and the junction portion 23 has an internal face 37. The internal faces 31, 32, 33 and 34 of the appendices and the internal face 37 of the junction portion 23 are circular portions being of a similar diameter, the internal face 37 being connected by each of the flat internal faces 35, 36 of the tightening portions 21, 22, such that said internal faces 31, 32, 33, 34, 35, 36 and 37 have dimensions and shapes corresponding to the dimensions and the shape of the motion transmission shaft 5 comprising two circular portions connected by two lands.

Other conjugated shapes could be arranged, without departing from the scope of this invention.

In an alternative embodiment of this invention, the yoke member of Cardan joint comprises one single reinforcing appendix 27, 28, 29 or 30 which is arranged on the tightening portion 21 or 22 in the vicinity of the tightening hole 25 or 24.

In another alternative embodiment, said yoke member of Cardan joint comprises two reinforcing appendices 27, 28 or 29, 30. Each reinforcing appendix is arranged on the corresponding tightening portion 21, 22 in the vicinity and on the same side of the tightening hole 25, 24, thereby to be opposite one relative to the other.

In another alternative embodiment, said yoke member of Cardan joint comprises two reinforcing appendices 27, 29 or 28, 30. Both appendices are arranged on the same tightening portion 21 or 22 in the vicinity and on both sides of the tightening hole 25 or 24.

In another alternative embodiment, said yoke member of Cardan joint comprises two reinforcing appendices 27, 30 or 28, 29. A reinforcing appendix 27, 29 or 28, 30 is arranged on one of the tightening portions 21 or 22 in the vicinity and on one side of the tightening hole 25, 24. The other reinforcing appendix 30, 28 or 29, 27 is arranged on the other tightening portion 22, 21 in the vicinity and on the other side of the tightening hole 24, 25. Thus, in this alternative embodiment, there are two cases: the first case with both appendices 27 and 30 of the tightening portion 21 and the tightening portion 22 offset one relative to the other; and the second case with both appendices 28 and 29 of the tightening portion 22 and the tightening portion 21 offset one relative to the other.

According to the invention, the yoke member of Cardan joint is formed as one single unitary component which is achieved through stamping. Said yoke member is obtained through deforming a metal sheet cut-out 7 shown on FIGS. 3 and 4. The metal sheet 7 has a thickness defined so as to ensure the holding and strength functions in the regions of the yoke member subjected to relatively low forces resulting in low stresses.

Figure 3:
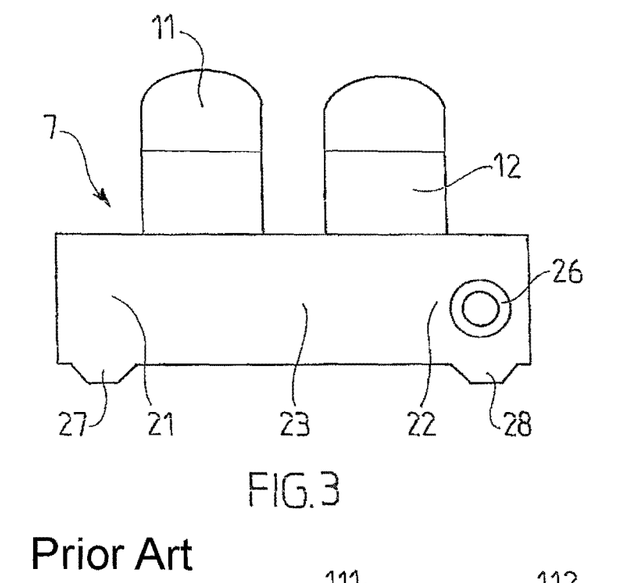
FIG. 3 is a view of the metal sheet cut-out before stamping.
Figure 4:
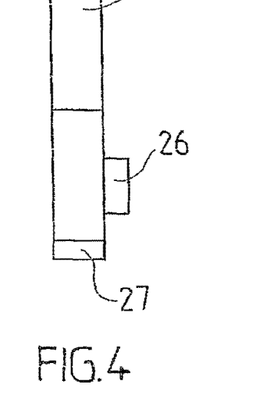
FIG. 4 is a sideways view of the metal sheet cut-out shown in FIG. 3.

Said metal sheet 7 comprises an excess of material 27, 29 on each of both sides of the tightening portion 21, and an excess of material 28, 30 on each of both sides of the tightening portion 22. Both tightening portions 21 and 22 are connected by the junction portion 23 forming all three a rectangular cut-out onto which there are arranged, on the other side of the excesses of material 27 and 28, two cut-outs 11 and 12 with the shape of two pivot arm portions. The reinforcing appendix 26 as shown in FIGS. 3 and 4 is not part of the metal sheet cut-out 7, but is obtained through plunging as will be described hereinafter in the manufacturing method.

The excesses of material are arranged in the vicinity of the regions which are subjected to high forces, resulting in high stresses, thereby to obtain, through stamping, the reinforcing appendices 27, 28, 29 and 30.

Deforming said metal sheet 7 occurs according to the method, that will be described herein below, i.e. without any breaking of the material fibers making up said metal sheet, so that said yoke member be only made up of continuous fibers, thereby to obtain the desired thickness in desired sizes, for each of the highly stressed and lowly stressed regions.

The regions of the tightening portions 21 and 22 have internal faces 35 and 36 which are in contact with the motion transmission shaft 5, and transmit the torque of the steering wheel to the steering rack.

The region of the junction portion 23 has an internal face 37 which is a positioning abutment of the yoke member on the transmission shaft 5.

In other non shown modes of embodiment, the internal faces 35, 36 and 37 are integrally joined into one, with a splined cylindrical shape so as to be mounted on a splined cylindrical shaft 5.

The regions of the crossing holes 13 and 14 are interfaces with needled bushings supporting the cross-piece. The zones of the reinforcing appendices 27 and 28 have internal faces 31 and 32 which are abutments on the transmission shaft 5 and serve to react to the tightening force of the screw, so that the pliers made up by the reinforcing appendices 27 and 28 do not come in contact therebetween. The regions of the reinforcing appendices 29 and 30 have internal faces 33 and 34 which have the same function as the regions of the appendices 27 and 28; but these are distributed on the other side where the tightening screw crosses, and they allow for some balancing of the recovery of the tightening force. The region of the reinforcing appendix 26 is adapted to give a sufficient tapping length in order to meet the customer's specifications regarding the tightening behavior and the holding of screw tapping.

In the current state of the art, in order to obtain a stamped metal sheet yoke member, the used technique is:
  either to select a thick metal sheet the thickness of which will be varied through hitting or rolling, involving significant work-hardenings in the regions where this is not required as these are the less thick ones,
  or to fold the metal sheet on itself, as on FIG. 5, this limiting the possibilities to a multiple of said metal sheet, with an inhomogeneous region with weakened features in the pliers folding regions 111 and 112, the external fibers of which being too tightened.

In the hereinafter described method of this invention, moving the material could be achieved through pressing, plunging, embossing and this will occur without breaking the fibers of the material, thereby to obtain the desired thickness in the desired sizes.

The used tools with a shape appropriate depending on the desired shifting direction are used on the current production means with a very competitive cost.

All the regions with an over-thickness are arranged in highly biased regions and will have surface features improved by the used method of this invention, resulting in some hardening by work-hardening related to the material shifting method.

Figure 6:
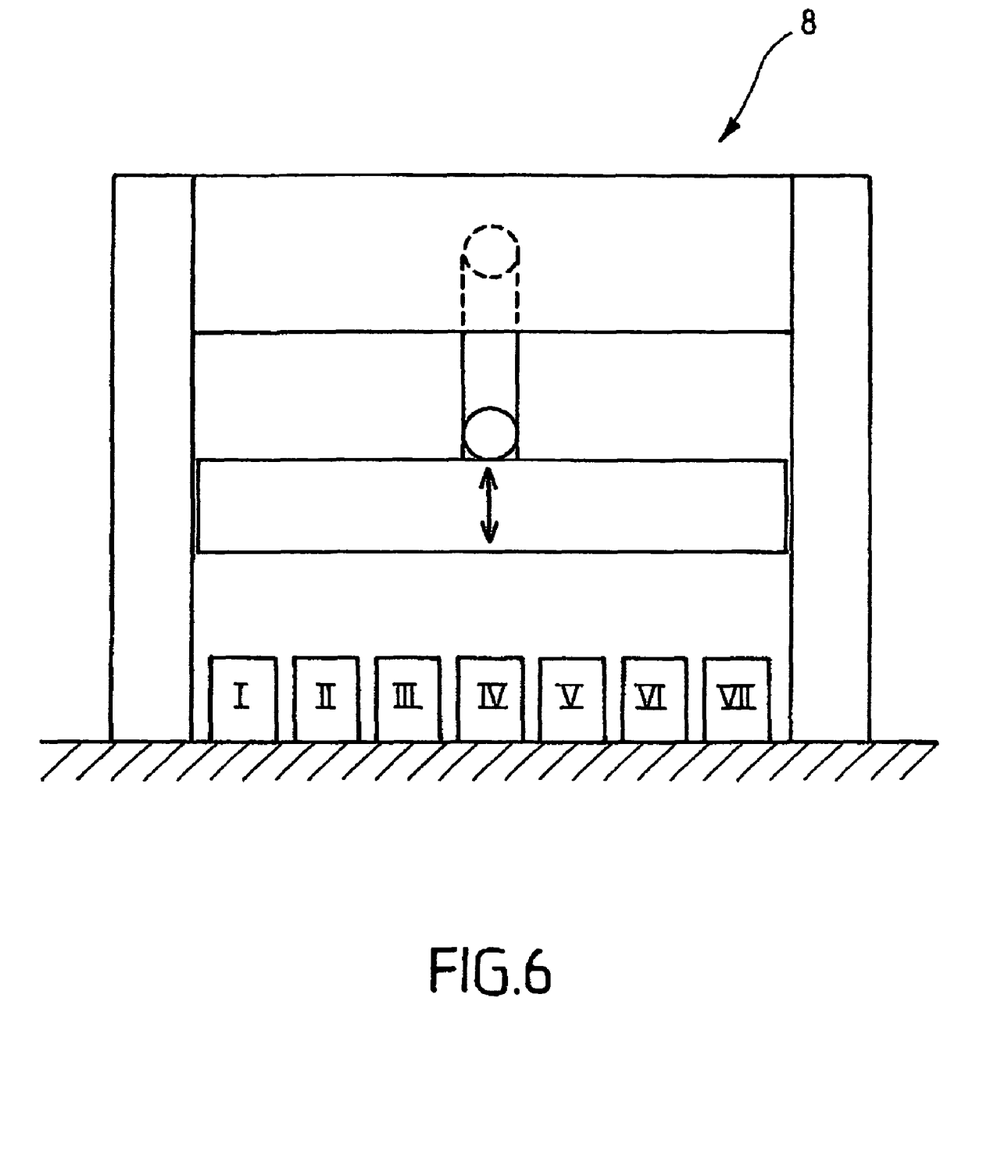
FIG. 6 is a schematic view of a transfer press allowing implementing the method for obtaining the yoke member of Cardan joint on FIGS. 1 and 2.

The method of manufacturing the hereinabove-described yoke member of Cardan joint shown on FIGS. 1 and 2 includes the following steps of:
  cutting a thick metal sheet 7 with an excess of material with shapes for all four appendices 27, 28, 29 and 30,
  heat treating depending to the desired strength,
  making various operations on a transfer press 8 as shown in FIG. 6:
  1. offsetting both pivot arm portions 11, 12 upwards on a support I,
  2. punching the hole 13, 14 of each of both arm portions 11, 12 on a support II,
  3. shifting material through stamping to the desired position of all four shapes for the appendices on a support III,
  4. punching each of both tightening holes 25, 24, one 25 of the two holes having a crossing diameter for accommodating the screw, and the other hole 4 being smaller so as to achieve the reinforcing appendix 26 obtained through plunging before screw tapping on a support IV,
  5. shifting material through plunging so as to obtain the reinforcing appendix 26 of the tightening hole 24 on a support V,
  6. folding downwards so as to bring closer both tightening portions 21, 22 with their corresponding pivot arm portions 11, 12 one relative to the others at approximately 60° on a support VI,
  7. hitting each of both tightening portions 21, 22, so as to obtain the final shape with both tightening portions 21, 22 and both pivot arm portions 11, 12 parallel one relative to the others, on a support VII.

According to the invention, said yoke member of Cardan joint can be arranged in a steering column at one of the ends or at each end of the middle portion.

The yoke member of the Cardan joint can thus be used in an electric assistance steering column arranged in the top portion of the column.

Thus, the stamped metal sheet yoke member according to the invention has tightening holding and screw tapping strength features which are significantly higher to those of a traditional stamped yoke member.

The regions adapted to reinforce the yoke member are no longer achieved through folding, but through deformation, resulting in homogeneous abutment regions better withstanding the compression due to the screw being tightened under a high torque.

All the abutment regions are defined so that the machining operations are more reliable and the trimming operations significantly simplified. Both reinforcing appendices 27 and 28, both tightening portions 21 and 22 as well as the junction portion 23 end into a transversal common face which is the opposite of two pivot arm portions 11 and 12 of the pivot fork 1. Said common face is a transversal end face 41 comprising the transversal end face 43 of the reinforcing appendix 27 and the transversal end face 44 of the reinforcing appendix 28.

Both transversal end faces 43 and 44 are merged with the transversal end face 41 or are arranged proximate said face 41. Both reinforcing appendices 29 and 30, both tightening portions 21 and 22 as well as the junction portion 23 end into a transversal common face which is located on the side of both pivot arm portions 11 and 12 of the pivot fork. Said common face is a transversal end face 42 comprising: the transversal end face 45 of the reinforcing appendix 29 and the transversal end face 46 of the reinforcing appendix 30. Both transversal end faces 45 and 46 are arranged proximate the transversal end face 42 or merged with said face 42.

Such a feature of this invention allows having a better strength to the plastic deformation on tightening and a better contact on the pinion of the steering rack upon the assembly of the vehicle. Such a feature is basic upon the tightening and the transmission of high rotation torques on the steering column. Indeed, according to the invention, as described, deforming the metal sheet 7 occurs without breaking the fibers of the material making up said metal sheet, i.e. without any folding.

In an embodiment, the appendices 29 and 30 are achieved through partially cutting the metal sheet. Such a cutting operation is provided thereby to optimize the holding on the pinion.

What is claimed is:

1. A yoke member of Cardan joint of a motion transmission shaft including a yoke member pivot axis and a tightening axis on a transmission shaft,
   (a) said yoke member of Cardan joint being made in one unitary part through stamping and obtained through deforming a metal sheet having a thickness defined thereby to meet holding and strength functions,
   (b) said metal sheet being deformed without any breaking of material fibers making up such metal sheet, so that said yoke member be only made up of continuous fibers so as to obtain a desired thickness in desired sizes,
   (c) said yoke member including:
      (1) a pivot fork including two pivot arm portions each comprising a crossing hole, the axis of which is said pivot axis of a cross-piece, and
      (2) a connecting element for said transmission shaft, said connecting element having two tightening portions connected one to the other via a junction portion, each of said two tightening portions comprising a tightening hole, the axis of which is said tightening axis,
      (3) first and second reinforcing appendices arranged through stamping respectively on the one of said tightening portions in the vicinity and on the same side of said tightening hole thereof, said first and second reinforcing appendices being opposite one relative to the other and in the vicinity of one of transversal end faces of said connecting element, and
      (4) third and fourth reinforcing appendices arranged through stamping respectively on the other tightening portion in the vicinity and on the same side of the tightening hole thereof, said third and fourth reinforcing appendices being opposite one relative to the other and in the vicinity of the other transversal end face of said connecting element.

2. A yoke member of Cardan joint as defined in claim 1, including at least one reinforcing appendix arranged on a tightening portion in the vicinity of said tightening hole and proximate said corresponding transversal end face.

3. A yoke member of Cardan joint as defined in claim 2, wherein said reinforcing appendix has a tapering section decreasing from the tightening portion on which said reinforcing appendix is arranged.

4. A yoke member of Cardan joint as defined in claim 1, including two reinforcing appendices, each reinforcing appendix being arranged on the corresponding one of said tightening portions in the vicinity and on the same side of said tightening hole thereof, and proximate said corresponding transversal end face, said reinforcing appendices being opposite one relative to the other.

5. A yoke member of Cardan joint as defined in claim 4, wherein said two reinforcing appendices make up, together with said tightening portions and with the junction portion, a housing of said transmission shaft.

6. A yoke member of Cardan joint as defined in claim 5, wherein said two reinforcing appendices and the junction portion have internal faces which are circular and which are connected by internal faces of said tightening portions, so that said internal faces of said two reinforcing appendices have dimensions and shapes matching the dimensions and the shape of the transmission shaft which comprises two circular portions connected by two lands.

7. A yoke member of Cardan joint as defined in claim 1, including two reinforcing appendices arranged on the one of said tightening portions in the vicinity and on both sides of the tightening hole thereof, and proximate said corresponding transversal end face.

8. A yoke member of Cardan joint as defined in claim 1, including first and second reinforcing appendices, said first reinforcing appendix being arranged on one of the tightening portions in the vicinity and on one side of the tightening hole thereof, and said second reinforcing appendix being arranged on the other tightening portion in the vicinity and on the other side of the tightening hole thereof, said first and second reinforcing appendices being arranged proximate said corresponding transversal end face.

9. A yoke member of Cardan joint as defined in claim 1, including:
   first and second reinforcing appendices arranged through stamping respectively on the one of said tightening portions in the vicinity and on the same side of said tightening hole thereof, said first and second reinforcing appendices being opposite one relative to the other and in the vicinity of one of transversal end faces of said connecting element, and
   third and fourth reinforcing appendices arranged through stamping respectively on the other tightening portion in the vicinity and on the same side of the tightening hole thereof, said third and fourth reinforcing appendices being opposite one relative to the other and in the vicinity of the other transversal end face of said connecting element.

10. A yoke member of Cardan joint as defined in claim 1, including:
   first and second reinforcing appendices arranged through stamping on the one of said tightening portions in the vicinity and on the same side of the tightening hole thereof, said first and second reinforcing appendices being opposite one relative to the other and having transversal end faces merged with one of transversal end faces of said connecting element, and
   third and fourth reinforcing appendices arranged through stamping on the other tightening portion in the vicinity and on the same side of the tightening hole thereof, said third and fourth reinforcing appendices being opposite one relative to the other and having transversal end faces merged with the other transversal end face of said connecting element.

11. A yoke member of Cardan joint as defined in claim 1, wherein one of said tightening holes is intended to accommodate a screw tapping and surrounded with a reinforcing appendix on the external face of the tightening portion on which said reinforcing appendix is arranged, said reinforcing appendix being obtained through plunging starting from a smaller hole.

12. A yoke member of Cardan joint as defined in claim 1, wherein:
   said two pivot arm portions of said pivot fork are arranged on both sides and symmetrically with respect to said transmission shaft and are offset and connected respectively to said tightening portions by diverging from said transmission shaft, said two tightening portions of said connecting element are arranged on both sides and symmetrically with respect to said transmission shaft, said yoke member includes two couples of reinforcing appendices, the reinforcing appendices of each couple being opposite and arranged on a respective side and in the vicinity of said tightening holes and being respectively connected to said tightening portions, so as to achieve, with said junction portion, two housings having internal shapes conjugated with the shape of said transmission shaft, and one of said tightening holes includes a screw tapping and is surrounded with one of said reinforcing appendices on an external face of the respective tightening portion.

13. A yoke member of Cardan joint as defined in claim 1, wherein said first and second appendices are arranged on one side of said tightening holes, and said third and fourth appendices are arranged on the other side of said tightening holes.

* * * * *